US011240617B2

(12) United States Patent
Han

(10) Patent No.: US 11,240,617 B2
(45) Date of Patent: Feb. 1, 2022

(54) AUGMENTED REALITY BASED SIMULATION APPARATUS FOR INTEGRATED ELECTRICAL AND ARCHITECTURAL ACOUSTICS

(71) Applicant: JLAB Corporation, Seoul (KR)

(72) Inventor: Dae Jin Han, Gyeonggi-do (KR)

(73) Assignee: JLAB Corporation, Seoul (KR)

( * ) Notice: Subject to any disclaimer, the term of this patent is extended or adjusted under 35 U.S.C. 154(b) by 0 days.

(21) Appl. No.: 17/217,930

(22) Filed: Mar. 30, 2021

(65) Prior Publication Data
US 2021/0314715 A1    Oct. 7, 2021

(30) Foreign Application Priority Data

Apr. 2, 2020   (KR) .................. 10-2020-0040186
Nov. 3, 2020   (KR) .................. 10-2020-0145234

(51) Int. Cl.
 H04R 29/00    (2006.01)
 G06T 11/00    (2006.01)
 G06F 3/16     (2006.01)
(52) U.S. Cl.
 CPC .......... H04R 29/001 (2013.01); G06F 3/165 (2013.01); G06T 11/00 (2013.01)
(58) Field of Classification Search
 CPC .......... G06F 1/163; G06F 3/011; G06F 3/015; G06F 3/165; G06F 3/04847; G06F 3/147;
 (Continued)

(56) References Cited

U.S. PATENT DOCUMENTS 6,901,379 B1 *  5/2005  Balter .................... G06Q 30/06
                                                         434/395
8,170,222 B2 *  5/2012  Dunko .................... H04S 7/302
                                                          381/58
(Continued)

FOREIGN PATENT DOCUMENTS

KR   1020080113890 A   12/2008
KR   1020150008329 A    1/2015
(Continued)

OTHER PUBLICATIONS

Pelzer, et al., Integrating Real-Time Room Acoustics Simulation into a CAD Modeling Software to Enhance the Architectural Design Process, Buildings 2014, Apr. 21, 2014, 113-138, vol. 2, MDPI, ISSN 2075-5309.

*Primary Examiner* — Gerald Gauthier
(74) *Attorney, Agent, or Firm* — Umberg Zipser LLP; Ryan Dean

(57) ABSTRACT

According to an exemplary embodiment of the present disclosure, a computer readable medium containing a computer program is disclosed. The computer program includes commands which cause a processor of an acoustic simulation apparatus to execute steps, and the steps includes: acquiring building structure information related to a building constituting a simulation space; acquiring building material information related to at least one building material used in the simulation space; obtaining speaker information related to at least one speaker installed in the simulation space; obtaining location information on a current location of the acoustic simulation apparatus; recognizing a virtual location corresponding to the current location in the simulation space by analyzing the location information; generating an image viewed from the virtual location based on the building structure information, the building material information, and the speaker information; and generating sound to be heard at
(Continued)

the virtual location based on the building structure information, the building material information, and the speaker information.

17 Claims, 10 Drawing Sheets

(58) Field of Classification Search
CPC ............... G06F 21/43; G06K 9/00597; G06K 9/00671; G06K 19/06037; G06Q 10/20; G06Q 30/0643; G06T 11/00; G06T 11/60; G06T 17/205; G06T 19/006; G06T 7/74; H04R 5/033; H04R 29/001; H04R 1/1041; H04R 3/005; H04W 4/029; A63F 13/211; G10H 1/0091; H04L 67/22; H04S 7/304
USPC ............ 345/427, 633; 381/17, 58, 309, 310, 381/71.7; 434/118; 704/9; 705/26.1, 705/27.2
See application file for complete search history.

(56) References Cited

U.S. PATENT DOCUMENTS

| | | | | |
|---|---|---|---|---|
| 8,606,645 | B1* | 12/2013 | Applefeld | G06Q 30/02 705/26.1 |
| 8,831,255 | B2* | 9/2014 | Crawford | H04S 7/306 381/309 |
| 9,906,885 | B2 | 2/2018 | Visser et al. | |
| 10,375,506 | B1* | 8/2019 | Moeller | H04R 5/033 |
| 10,878,600 | B1* | 12/2020 | Goodsitt | G06K 19/06037 |
| 11,026,024 | B2* | 6/2021 | Sahota | G02B 27/017 |
| 2002/0158873 | A1* | 10/2002 | Williamson | G06T 17/00 345/427 |
| 2010/0034404 | A1* | 2/2010 | Dent | H04R 5/02 381/310 |
| 2010/0040238 | A1* | 2/2010 | Jang | G06F 3/165 381/17 |
| 2011/0153310 | A1* | 6/2011 | Ehlen | H04L 67/04 704/9 |
| 2012/0075343 | A1* | 3/2012 | Chen | G06T 7/73 345/633 |
| 2013/0129103 | A1* | 5/2013 | Donaldson | H04R 3/12 381/71.1 |
| 2013/0307875 | A1* | 11/2013 | Anderson | G06T 19/006 345/633 |
| 2015/0003616 | A1* | 1/2015 | Middlemiss | H04S 7/303 381/17 |
| 2015/0092965 | A1* | 4/2015 | Umminger | H04S 7/304 381/310 |
| 2015/0302651 | A1* | 10/2015 | Shpigelman | G02B 27/0172 345/633 |
| 2015/0347854 | A1* | 12/2015 | Bare | G06K 9/00671 345/633 |
| 2015/0348329 | A1* | 12/2015 | Carre | H04N 21/4784 345/633 |
| 2016/0088417 | A1* | 3/2016 | Kim | H04S 1/005 381/17 |
| 2016/0140868 | A1* | 5/2016 | Lovett | G06T 19/006 434/118 |
| 2017/0301145 | A1* | 10/2017 | Miller | G06F 3/013 |
| 2018/0129276 | A1* | 5/2018 | Nguyen | G09B 9/00 |
| 2018/0165854 | A1* | 6/2018 | Du | G06N 20/00 |
| 2018/0181997 | A1* | 6/2018 | Sanjeevaiah Krishnaiah | H04L 67/18 |
| 2018/0275861 | A1* | 9/2018 | Mate | G06F 3/165 |
| 2018/0349088 | A1* | 12/2018 | Leppanen | G06F 3/04815 |
| 2019/0139312 | A1* | 5/2019 | Leppanen | G06F 3/0486 |
| 2019/0200158 | A1 | 6/2019 | Verbeke et al. | |
| 2019/0236844 | A1* | 8/2019 | Balasian | G06Q 10/20 |
| 2019/0246235 | A1* | 8/2019 | Bruser | H04S 7/304 |
| 2019/0251720 | A1* | 8/2019 | Hariton | G06T 19/00 |
| 2019/0278554 | A1* | 9/2019 | Gordon | H04R 29/001 |
| 2019/0278555 | A1* | 9/2019 | Carvajal | G06F 3/0481 |
| 2019/0318541 | A1* | 10/2019 | Sergott | G06T 11/00 |
| 2020/0168119 | A1* | 5/2020 | Ramani | G06Q 10/20 |
| 2020/0228539 | A1* | 7/2020 | Bonar | G06F 16/51 |
| 2020/0265121 | A1* | 8/2020 | Myers | G06T 17/205 |
| 2020/0265614 | A1* | 8/2020 | Jung | G06K 9/00671 |
| 2020/0356341 | A1* | 11/2020 | Satongar | G06F 3/162 |
| 2021/0004452 | A1* | 1/2021 | Swaminathan | G06F 21/305 |
| 2021/0006976 | A1* | 1/2021 | Swaminathan | A63F 13/212 |
| 2021/0151010 | A1* | 5/2021 | Lundmark | G09G 5/38 |
| 2021/0201029 | A1* | 7/2021 | Ju | G06K 9/6277 |
| 2021/0314715 | A1* | 10/2021 | Han | G06F 3/165 |

FOREIGN PATENT DOCUMENTS

| | | |
|---|---|---|
| KR | 1020160136160 A | 11/2016 |
| KR | 1020170094279 A | 8/2017 |
| KR | 101835675 B1 | 3/2018 |
| KR | 1020190044619 A | 4/2019 |
| KR | 101975920 B1 | 5/2019 |
| KR | 1020190132666 A | 11/2019 |
| KR | 1020200044278 A | 4/2020 |
| WO | 2016097732 A1 | 6/2016 |
| WO | 2018183390 A1 | 10/2018 |

* cited by examiner

Fig. 1B
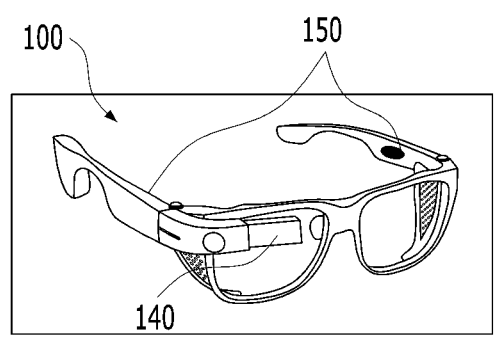
(a)
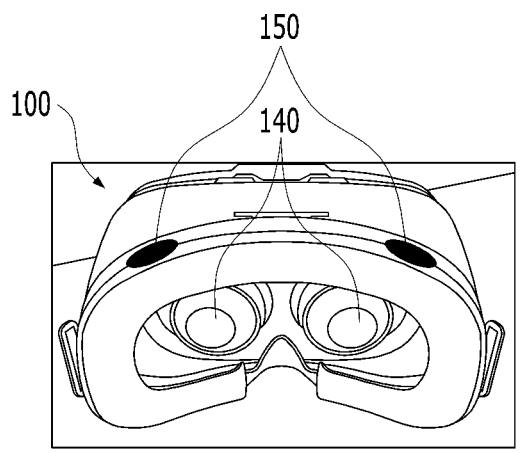
(b)

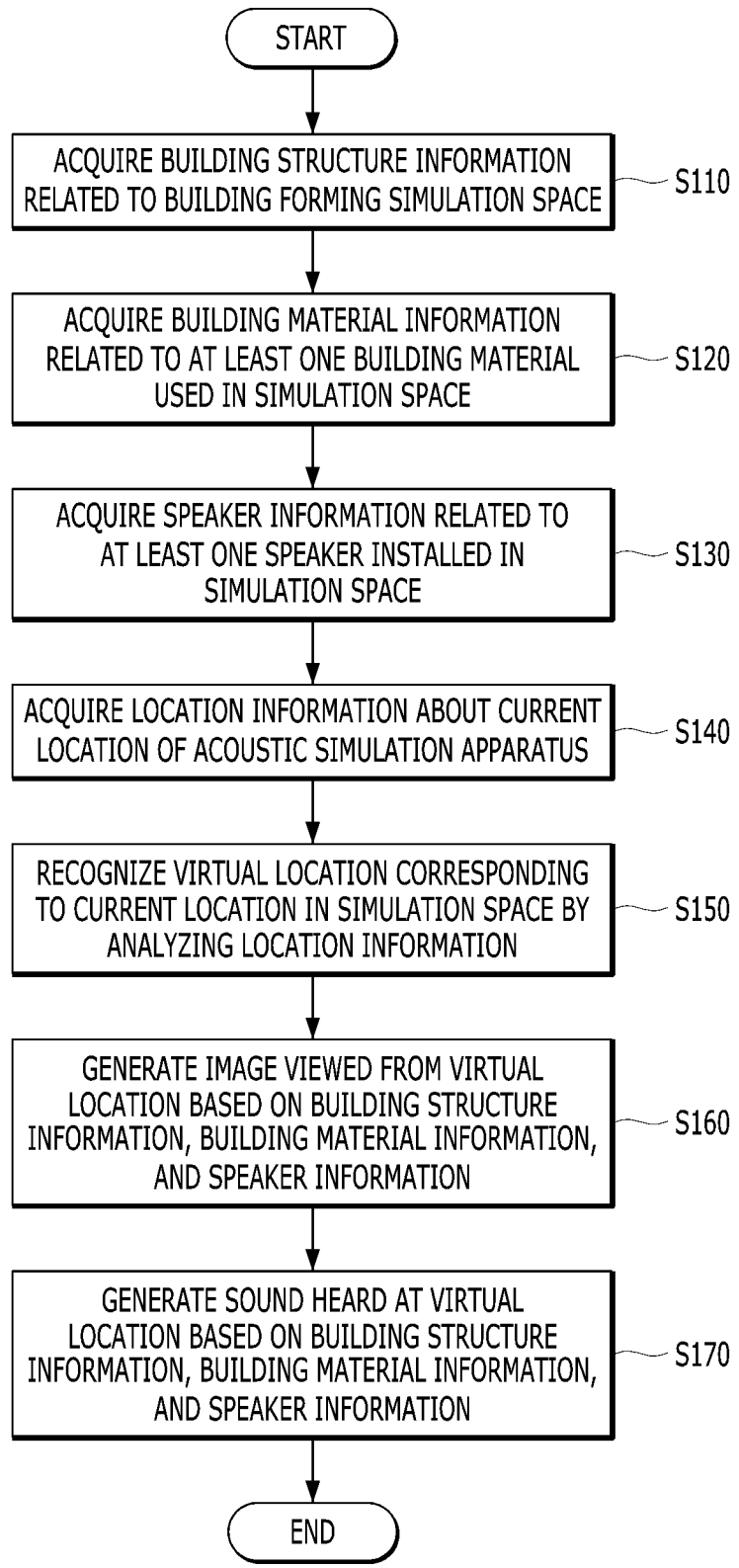

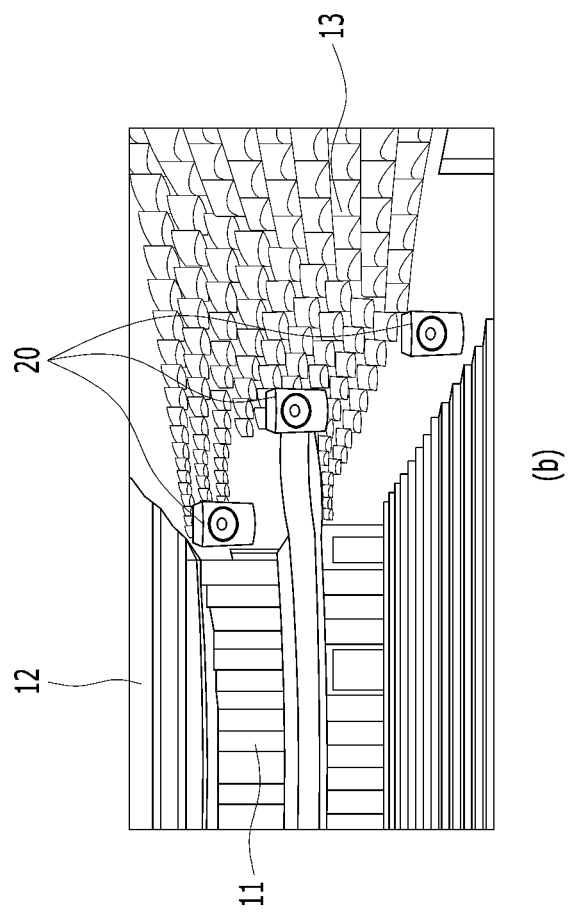
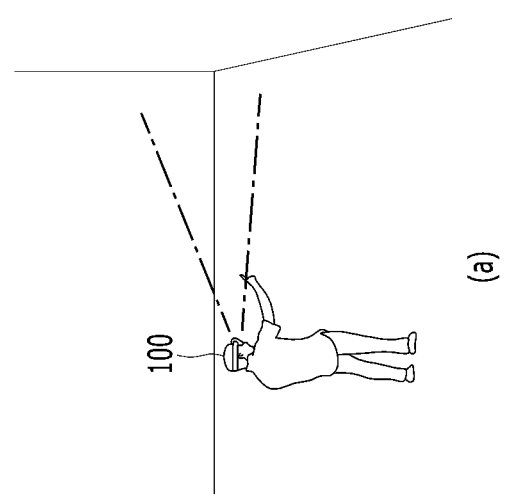
Fig. 3

AUGMENTED REALITY BASED SIMULATION APPARATUS FOR INTEGRATED ELECTRICAL AND ARCHITECTURAL ACOUSTICS

CROSS-REFERENCE TO RELATED APPLICATIONS

This application claims priority to and the benefit of Korean Patent Application No. 10-2020-0040186 filed in the Korean Intellectual Property Office on 2 Apr. 2020, the entire contents of which are incorporated herein by reference.

TECHNICAL FIELD

The present disclosure relates to an electrical sound and architectural sound integration simulation apparatus based on augmented reality, and more particularly, to a simulation apparatus for integrating and simulating electrical sound and architectural sound and then displaying the simulated sound to a user through augmented reality.

BACKGROUND ART

Recently, various contents implemented by using virtual information, such as virtual reality or augmented reality, have been suggested. The general virtual reality is a virtual space created by artificial technology by using a computer and the like, and has characteristics in that the virtual reality is similar to reality, but is not real. In the meantime, the augmented reality is one field of virtual reality, and refers to a technique that allows the user to recognize virtual information as a part of reality by synthesizing virtual information on a real object that the user sees.

In a virtual space to which virtual reality or augmented reality is applied, not only visual contents but also audio contents may be provided to the user. Accordingly, the virtual reality or augmented reality technology may be utilized in various fields requiring sight and hearing. For example, the virtual reality or augmented reality technology may be used in an acoustic design field.

In general, acoustic (particularly, architectural sound and/or electrical sound) design is implemented by depending on sound characteristics of a building, a speaker, and the like and an experience of a user. Further, the current acoustic design method is in an actual state where a speaker is directly installed inside a building and then an acoustic environment suitable for the building is created by using an acoustic measurement device. Accordingly, when the acoustic design is improperly performed, the current acoustic design method may incur unnecessary cost and has a limitation in performing accurate acoustic design.

Accordingly, research on an acoustic simulation method which overcomes the limitation of the current acoustic design method and is capable of more conveniently performing acoustic design is required.

DOCUMENTS OF RELATED ART

Patent Document (Patent Document 1) Korean Patent Application Laid-Open No. 10-2015-0008329

SUMMARY OF THE INVENTION

The present disclosure is conceived in response to the background art and has been made in an effort to provide an apparatus and a computer program for acoustic simulation.

The technical objects of the present disclosure are not limited to the foregoing technical objects, and other non-mentioned technical objects will be clearly understood by those skilled in the art from the description below.

According to several exemplary embodiments of the present disclosure for solving the foregoing object, a computer program stored in a computer-readable storage medium is disclosed. The computer program may include commands which cause a processor of an acoustic simulation apparatus to execute steps, and the steps may include: acquiring building structure information related to a building constituting a simulation space; acquiring building material information related to at least one building material used in the simulation space; obtaining speaker information related to at least one speaker installed in the simulation space; obtaining location information on a current location of the acoustic simulation apparatus; recognizing a virtual location corresponding to the current location in the simulation space by analyzing the location information; generating an image viewed from the virtual location based on the building structure information, the building material information, and the speaker information; and generating sound to be heard at the virtual location based on the building structure information, the building material information, and the speaker information.

The acquiring building material information related to at least one building material used in the simulation space may include: receiving a first input for selecting any one of a plurality of building materials usable in the simulation space; and acquiring the building material information related to the at least one building material used in the simulation space from among information related to the plurality of building materials stored in a memory based on the first input.

The acquiring building material information related to at least one building material used in the simulation space may further include controlling an image output unit to output first recommendation information for recommending any one of the plurality of building materials before receiving the first input, in which the first recommendation information may be generated by comparing sound expected to be generated by installing each of the plurality of building materials in the simulation space.

The obtaining speaker information related to at least one speaker installed in the simulation space may include: receiving a second input for selecting any one of a plurality of speakers that are able to be installed in the simulation space; and acquiring the speaker information related to the at least one speaker used in the simulation space from among information related to the plurality of speakers stored in a memory based on the second input.

The obtaining speaker information related to at least one speaker installed in the simulation space may further include: controlling an image output unit to output second recommendation information recommending any one of the plurality of speakers before receiving the second input; and controlling the image output unit to output third recommendation information recommending an installation location of the at least one speaker after receiving the second input, in which the third recommendation information is generated by comparing sound expected to be generated by installing a speaker selected through the second input at each of a plurality of locations.

The building structure information may include at least one of information on a plan design of the building, information on a ceiling shape of the building, information on a shape of a balcony disposed inside the building, information on a shape of inner wall of the building, or information on location and shape of reflector inside the building, and the building material information may include at least one of first appearance information on an appearance of the at least one building material, first sound information on reflectance of sound of the at least one building material, or second sound information on sound absorption coefficient of the at least one building material.

The generating an image viewed from the virtual location based on the building structure information, the building material information and the speaker information may include generating the image using the location information, the building structure information, the first appearance information, and the second appearance information.

The steps may further include outputting the image through an image output unit; in which the image may be a virtual image of an interior shape of the building in which the at least one building material and the at least one speaker are installed, which are visible from a view of the simulation space by a user equipped with the acoustic simulation apparatus at the virtual location.

The steps may further include controlling an image output unit made of a light-transmitting material to project the image to user's eyes, in which when user equipped with the acoustic simulation apparatus looks at the simulation space from the virtual location, the image may overlap on a general field of the user's vision.

The generating an image viewed from the virtual location based on the building structure information, the building material information, and the speaker information may include: dividing the simulation space into one or more sub-spaces; recognizing sub-sound characteristics of each of the one or more sub-spaces; and generating the image so that a video effect corresponding to each of the sub-sound characteristics is displayed in each of the sub-spaces.

The generating sound to be heard at the virtual location based on the building structure information, the building material information, and the speaker information may include: generating first sound characteristic information on characteristics of a first virtual sound emitted from the at least one speaker and directly transmitted to a user located at the virtual location and generating second sound characteristic information on a characteristic of a second virtual sound emitted from the at least one speaker and indirectly transmitted to the user located at the virtual location; and generating the sound based on the first sound characteristic information and the second sound characteristic information.

The generating first sound characteristic information and second sound characteristic information may include: generating the first sound characteristic information based on the installation location information, the location information, and the third sound information; and generating the second sound characteristic information based on the installation location information, the location information, the building structure information, the first appearance information, the first sound information, the second sound information, and the third sound information.

The second virtual sound may be a virtual sound changed by absorbing or reflecting the first virtual sound by the at least one building material.

The generating the first sound characteristic information based on the installation location information, the location information, and the third sound information may include: recognizing a first location in which the at least one speaker is installed using the installation location information; recognizing a second location, which is a current location of the acoustic simulation apparatus, using the location information; recognizing whether an object exists between the first location and the second location using the building structure information; and generating the first sound characteristic information by recognizing a sound wave emitted from the first position to the second position using the third sound information.

The generating the second sound characteristic information based on the installation location information, the location information, the building structure information, the first appearance information, the first sound information, the second sound information, and the third sound information may include: recognizing a first location in which the at least one speaker is installed using the installation location information; recognizing a second location, which is a current location of the acoustic simulation apparatus, using the location information; recognizing a first travel path of a virtual sound emitted from the at least one speaker using the third sound information; recognizing a second travel path changed by collision of the virtual sound using the building structure information when the first travel path of a virtual sound is recognized; recognizing first information on reflectance of a sounds of a specific building material existing between the first and second paths among the at least one building material and second information on sound absorption coefficient of the specific building material using the first sound information and the second sound information; generating the second sound characteristic information using the installation location information, the location information, the building structure information, the first appearance information, the first information, the second information, and the third sound information.

The steps may further include: obtaining information on an amplification amount for each preset frequency band of the sound, information on an attenuation amount for the preset frequency band, and information on a reverberation time for the preset frequency band when the sound to be heard at the virtual location is generated; controlling an image output unit to output the information an amplification amount for each preset frequency band, the information on an attenuation amount for the frequency band, and the information on a reverberation time for the preset frequency band together with the image; and controlling a sound output unit to output the sound.

According to several exemplary embodiments of the present disclosure for solving the foregoing object, an acoustic simulation apparatus is disclosed. The apparatus may include: a processor for acquiring building structure information related to a building constituting a simulation space; an image output unit for outputting an image related to the simulation space; and a sound output unit for outputting sound, in which the processor is further configured to: obtain speaker information related to at least one speaker installed in the simulation space and location information on a current location of the acoustic simulation apparatus, wherein the speaker information includes installation location information of the at least one speaker, second appearance information on an appearance of the at least one speaker, and third sound information on sound characteristics of the at least one speaker; recognize a virtual location corresponding to the current location in the simulation space by analyzing the location information; generate an image viewed from the virtual location based on the building structure information, building material information, and the speaker information including the installation location information of the at least one speaker and the second appearance information about the external shape of the at least one speaker; and generate sound to be heard at the virtual location based on the building structure information, the building material information, and the speaker information including the installation location information of the at least one speaker and the third sound information on the sound characteristics of the at least one speaker.

The technical solutions obtainable from the present disclosure are not limited to the foregoing solutions, and other non-mentioned solution means will be clearly understood by those skilled in the art from the description below.

The present disclosure may provide the acoustic simulation method which is capable of overcoming the limitation of the current acoustic design method and more conveniently performing acoustic design through the apparatus and the computer program for acoustic simulation.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 1B is a diagram for describing an example of the acoustic simulation apparatus according to several exemplary embodiments of the present disclosure.

FIG. 2 is a flowchart for describing an example of a method of simulating sound by the acoustic simulation apparatus according to several exemplary embodiments of the present disclosure.

FIG. 3 is a diagram for describing an example of an image displayed in the acoustic simulation apparatus of the present disclosure.

DETAILED DESCRIPTION

Figure 1A:
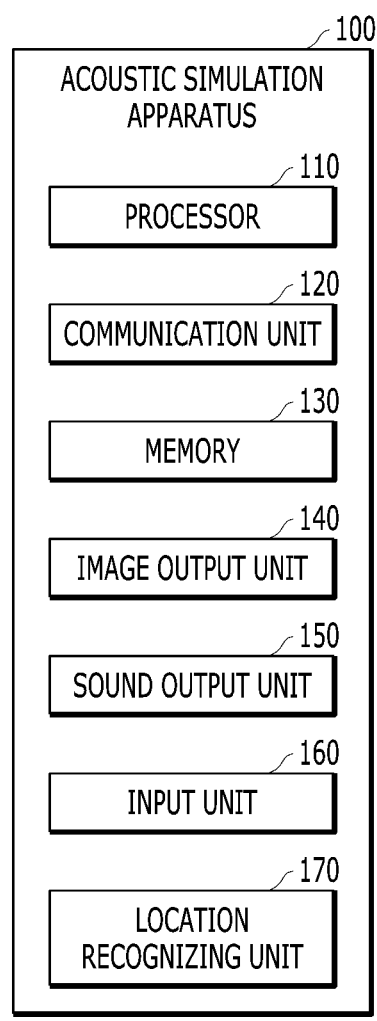
FIG. 1A is a block diagram illustrating an acoustic simulation apparatus according to several exemplary embodiments of the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include all of the aspects and the equivalents thereof. In particular, an "exemplary embodiment", an "example", an "aspect", an "illustration", and the like used in the present specification may not be construed to be better or have an advantage compared to a predetermined described aspect, an aspect having a different design, or designs.

Various aspects and characteristics will be presented by a system that may include one or more devices, terminals, servers, devices, components, and/or modules. The fact that various systems may include additional apparatuses, terminals, servers, devices, components, and/or modules, and/or the fact that various systems may not include all of the apparatuses, terminals, servers, devices, components, and modules discussed in relation to the drawings shall also be understood and recognized.

Terms, "computer program", "component", "module", "system", and the like used in the present specification may be compatibly used, and indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers.

The components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Hereinafter, the same or similar constituent element is denoted by the same reference numeral regardless of a reference numeral, and a repeated description thereof will be omitted. Further, in describing the exemplary embodiment disclosed in the present disclosure, when it is determined that a detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

A term used in the present specification is for describing the exemplary embodiments, and does not intend to limit the present disclosure. In the present specification, a singular form includes a plural form as well, unless otherwise mentioned. A term "comprises" and/or "comprising" used in the specification does not exclude the existence or an addition of one or more other constituent elements, in addition to the mentioned constituent element.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

Terms information" and "data" used in the present specification may be frequently used to be exchangeable with each other.

Suffixes, "~ module" and "~ unit" for a constituent element used for the description below are given or mixed in consideration of only easiness of the writing of the specification, and the suffix itself does not have a discriminated meaning or role.

An object and effect of the present disclosure and technical configurations for achieving them will be apparent with reference to the exemplary embodiments described below in detail together with the accompanying drawings. In describing the present disclosure, when it is determined that detailed description of known function or configurations unnecessarily obscures the subject matter of the present disclosure, the detailed description may be omitted. Further, the terms used in the description are defined in consideration of the function in the present disclosure and may vary depending on an intention or usual practice of a user or operator.

However, the present disclosure is not limited to the exemplary embodiments disclosed below, but may be implemented in various different forms. However, the present exemplary embodiments are provided only to make the present disclosure complete, and to fully inform the scope of the disclosure to those skilled in the art, and the present disclosure is only defined by the scope of the claims. Accordingly, the definition should be made based on the content throughout the present specification.

The scope of the steps in the claims of the present disclosure is generated by the functions and features described in each step, and unless the precedence relationship of the order is specified in each step, the scope of the right is not affected by the order of description of each step. For example, in the claims described with steps including step A and step B, even though step A is described before step B, the scope of the right is not limited to that step A must precede step B.

According to the several exemplary embodiments of the present disclosure, a sound simulation apparatus 100 may mean an electrical sound and architectural sound integration simulation apparatus based on augmented reality. In particular, the acoustic simulation apparatus 100 may mean a simulation apparatus for integrating and simulating electrical sound and architectural sound and then displaying the simulated sound to a user through augmented reality. However, the present disclosure is not limited thereto.

FIG. 1A is a block diagram illustrating an acoustic simulation apparatus according to several exemplary embodiments of the present disclosure. FIG. 1B is a diagram for describing an example of the acoustic simulation apparatus according to several exemplary embodiments of the present disclosure.

Referring to FIG. 1A, an acoustic simulation apparatus 100 may include a processor 110, a communication unit 120, a memory 130, an image output unit 140, a sound output unit 150, an input unit 160, and a location recognizing unit 170. However, the foregoing constituent elements are not essential for implementing the acoustic simulation apparatus 100, so that the acoustic simulation apparatus 100 may include more or less constituent elements than the foregoing listed constituent elements.

According to several exemplary embodiments of the present disclosure, the acoustic simulation apparatus 100 may be used for building acoustic design or electroacoustic design. However, the present disclosure is not limited thereto.

The acoustic simulation apparatus 100 may include, for example, a portable phone, a smart phone, a notebook computer (laptop computer), a wearable device (a glass-type terminal (smart glass) and Head Mounted Display (HMD)) and the like. However, the present disclosure is not limited thereto.

First, the communication unit 120 of the acoustic simulation apparatus 100 may include one or more modules which allow the acoustic simulation apparatus 100 and an external server or the acoustic simulation apparatus 100 and an external terminal (for example, a user terminal) to communicate with each other. Further, the communication unit 120 may include one or more modules that connect the acoustic simulation apparatus 100 to one or more networks.

Herein, the network establishing the communication between the acoustic simulation apparatus 100 and the external server or the acoustic simulation apparatus 100 and the external terminal may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

The network according to the exemplary embodiments of the present disclosure may be configured regardless of its communication mode, such as a wired mode and a wireless mode, and may be configured of various communication networks, such as a Personal Area Network (PAN) and a Wide Area Network (WAN). Further, the network may be the publicly known World Wide Web (WWW), and may also use a wireless transmission technology used in PAN, such as Infrared Data Association (IrDA) or Bluetooth.

The technologies described in the present specification may be used in other networks, as well as the foregoing networks.

In the meantime, the memory 130 of the acoustic simulation apparatus 100 may store a program for an operation of the processor 110 and may also temporarily or permanently store input/output data. The memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The memory 130 may be operated under the control of the processor 110.

According to several exemplary embodiments of the present disclosure, the memory 130 may store information for acoustic simulation. For example, the memory 130 may store building material information about a plurality of building materials usable in a simulation space and speaker information about a plurality of speakers usable in a simulation space. However, the present disclosure is not limited thereto.

In the meantime, the processor 110 of the acoustic simulation apparatus 100 may perform acoustic simulation by using the building material information and the speaker information stored in the memory 130.

The processor 110 may provide a user with an image and sound generated according to the performance of the acoustic simulation. In particular, the processor 110 may control the image output unit 140 so as to output the image. Further, the processor 110 may control the sound output unit 150 so as to output the sound.

Hereinafter, the method of performing, by the processor 110, the acoustic simulation will be described below with reference to FIGS. 2 to 5.

The image output unit 140 of the acoustic simulation apparatus 100 displays (outputs) information processed by the acoustic simulation apparatus 100. For example, the image output unit 140 may display execution image information of an application program driven in the acoustic simulation apparatus 100 or User Interface (UI) and Graphic User Interface (GUI) information according to the execution image information.

The image output unit 140 of the acoustic simulation apparatus 100 according to several exemplary embodiments of the present disclosure may be configured as a stereoscopic display unit displaying a stereoscopic image.

A stereoscopic display method, such as a stereoscopic method (glasses method), an auto-stereoscopic method (no glasses method), and a projection method (holographic method), may be applied to the stereoscopic display unit.

In general, a three-dimensional (3D) stereoscopic image consists of a left image (image for a left eye) and a right image (image for a right eye). The method of displaying the 3D stereoscopic image is divided into a top-down method in which a left image and a right image are arranged up and down in one frame, a left-to-right (L-to-R, side by side) method in which a left image and a right image are arranged left and right in one frame, a checker board method in which pieces of a left image and a right image are arranged in a tile form, an interlaced method in which a left image and a right image are alternately arranged in the unit of a column or row, and a time sequential (frame by frame) method in which a left image and a right image are alternately displayed by time.

A 3D thumbnail image may be generated as one image by generating a left image thumbnail and a right image thumbnail from a left image and a right image of an original image frame, respectively, and combining the generated left and right thumbnail images. In general, the thumbnail means a reduced image or a reduced still image. The generated left image thumbnail and the right image thumbnail are displayed on a screen with a left-right distance difference by a depth corresponding to a sight difference between the left image and the right image to exhibit a 3D sense of space.

The left image and the right image required for implementing the 3D stereoscopic image may be displayed on the stereoscopic display unit by a stereoscopic processing unit. The stereoscopic processing unit receives a 3D image (an image at a reference view point and an image at an expanded view point) and sets the received 3D image as a left image and a right image, or receives a 2D image and converts the 2D image to a left image and a right image.

In the meantime, referring to (a) of FIG. 1B, the acoustic simulation apparatus 100 (in particular, the image output unit 140 of the acoustic simulation apparatus 100) may project an image to the eye of the user by using a prism. Further, the prism may be formed to be transparent so that the user is capable of seeing the projected image and the general field of vision in front (the range that the user sees through the eyes).

As described above, the image output through the image output unit 140 of the acoustic simulation apparatus 100 may overlap on the user's general field of vision to be displayed to the user. The acoustic simulation apparatus 100 may provide Augmented Reality (AR) that superimposes a virtual image on a real image or a background and displays the superimposed image as one image by using the characteristic of the display.

In the meantime, referring to (b) of FIG. 1B, the acoustic simulation apparatus 100 may be implemented in the form of a Head Mounted Display (HMD) as illustrated. The HMD type refers to a display scheme that is mounted on the head and shows an image directly in front of the eyes of a user. The image output unit 140 may be arranged so as to correspond to at least one of the left eye and the right eye so as to directly provide the image in front of the eye of the user when the user wears the acoustic simulation apparatus 100 in the type of glasses. In the drawings, it is exemplified that the image output units 140 are located at portions corresponding to the right eye and the left eye so as to output the image toward the right eye and the left eye of the user.

The acoustic simulation apparatus 100 may provide Virtual Reality (VR) that shows an image or a background of a virtually generated virtual space as an image by using the characteristics of the display.

Referring to (a) and (b) of FIG. 1B, the plurality of sound output units 150 of the acoustic simulation apparatus 100 may be provided to be configured to output stereo sound (hereinafter, simulated sound).

The acoustic simulation apparatus 100 described with reference to FIG. 1B are the several illustrative aspects for helping the understanding of the present disclosure, and the acoustic simulation apparatus 100 of the present disclosure is not limited to the form illustrated in FIG. 1B.

Referring back to FIG. 1A, the sound output unit 150 of the acoustic simulation apparatus 100 may output simulated sound or output sound data stored in the memory 130. The sound output unit 150 may also output a sound signal related to a function performed in the acoustic simulation apparatus 100. The sound output unit 150 may include a receiver, a speaker, a buzzer, and the like.

The sound output unit 150 may be implemented with a receiver which delivers simulated sound to the ear of the user. Further, the sound output unit 150 may be implemented with an earphone worn on the ear of the user. That is, the sound output unit 150 may receive simulated sound from the acoustic simulation apparatus 100 and output the sound through wired communication or wireless communication. In addition, the sound output unit 150 may be implemented in the form of a loud speaker that outputs various alarm sounds or playback sounds of multimedia. Further, the sound output unit 150 may be provided to at least one of front/rear surfaces or a lateral surface of the body of the acoustic simulation apparatus 100. However, the present disclosure is not limited thereto.

The input unit 160 of the acoustic simulation apparatus 100 is for receiving information from the user, and when information is input through the input unit 160, the processor 110 may control the operation of the acoustic simulation apparatus 100 so as to correspond to the input information. The input unit 160 may include a mechanical input means (or a mechanical key, for example, a button, a dome switch, a jog wheel, and a jog switch located on a front/rear surface or a lateral surface of the acoustic simulation apparatus 100) and a touch-type input means.

For example, the touch-type input means included in the input unit 160 may be implemented with a virtual key, a soft key, or a visual key displayed in a touch screen (herein, the touch screen may be provided on a rear-lateral surface of the acoustic simulation apparatus 100 for receiving the touch input of the user) through software processing, or may be implemented with a touch key disposed in a portion other than the touch screen, but the virtual key or the visual key may be displayed on the touch screen with various forms, and may be formed of graphics, text, an icon, video, or a combination thereof.

The input unit 160 may include a camera or image input unit for inputting an image signal, a microphone for inputting an audio signal, or an audio input unit.

For example, the input unit 160 may receive an image signal input from the user and acquire control information of the acoustic simulation apparatus 100. For example, a gesture of the user may be photographed through a camera included in the input unit 160. In this case, the processor 110 may perform an operation corresponding to the photographed gesture (hereinafter, the operation corresponding to the gesture may be stored in the memory 130 in advance). However, the present disclosure is not limited thereto.

For another example, the input unit 160 may acquire control information of the acoustic simulation apparatus 100 by receiving an audio signal input from the user. For example, the microphone or the audio input unit included in the input unit 160 may acquire a voice command of the user. In this case, the processor 110 may perform an operation corresponding to the acquired voice command (herein, the operation corresponding to the voice command may be stored in the memory 130 in advance). However, the present disclosure is not limited thereto.

The location recognizing unit 170 of the acoustic simulation apparatus 100 may be interlinked with a Global Positioning System (GPS) for checking a location of the acoustic simulation apparatus 100. That is, the location recognizing unit 170 may transceive location information for checking the location of the GPS and the acoustic simulation apparatus 100. The useful location information may be acquired by two or less or more satellites. However, the present disclosure is not limited thereto, and the location of the acoustic simulation apparatus 100 may be tracked by using all of the technologies for tracking the location of the acoustic simulation apparatus 100, as well as the GPS technology.

The processor 110 of the acoustic simulation apparatus 100 generally controls the general operation of the acoustic simulation apparatus 100. The processor 110 may provide the user with appropriate information or function or process appropriate information or function by processing the signal, the data, the information and the like input or output by the foregoing constituent elements or driving the application program stored in the memory 130.

The processor 110 may control at least a part of the constituent elements described with reference to FIG. 1A for driving the application program stored in the memory 130. Further, the processor 110 may combine at least two or more among the constituent elements included in the acoustic simulation apparatus 100 and operate the combined constituent elements in order to drive the application program.

According to the exemplary embodiments of the present disclosure, the processor 110 of the acoustic simulation apparatus 100 may perform acoustic simulation by using the information stored in the memory 130. Further, the processor 110 may provide the user with an image and sound generated according to the performance of the acoustic simulation.

That is, the acoustic simulation apparatus 100 according to the exemplary embodiments of the present disclosure may provide the user with the method of more conveniently performing acoustic design.

Hereinafter, the method of performing, by the processor 110, the acoustic simulation will be described below with reference to FIGS. 2 to 5.

Figure 4:
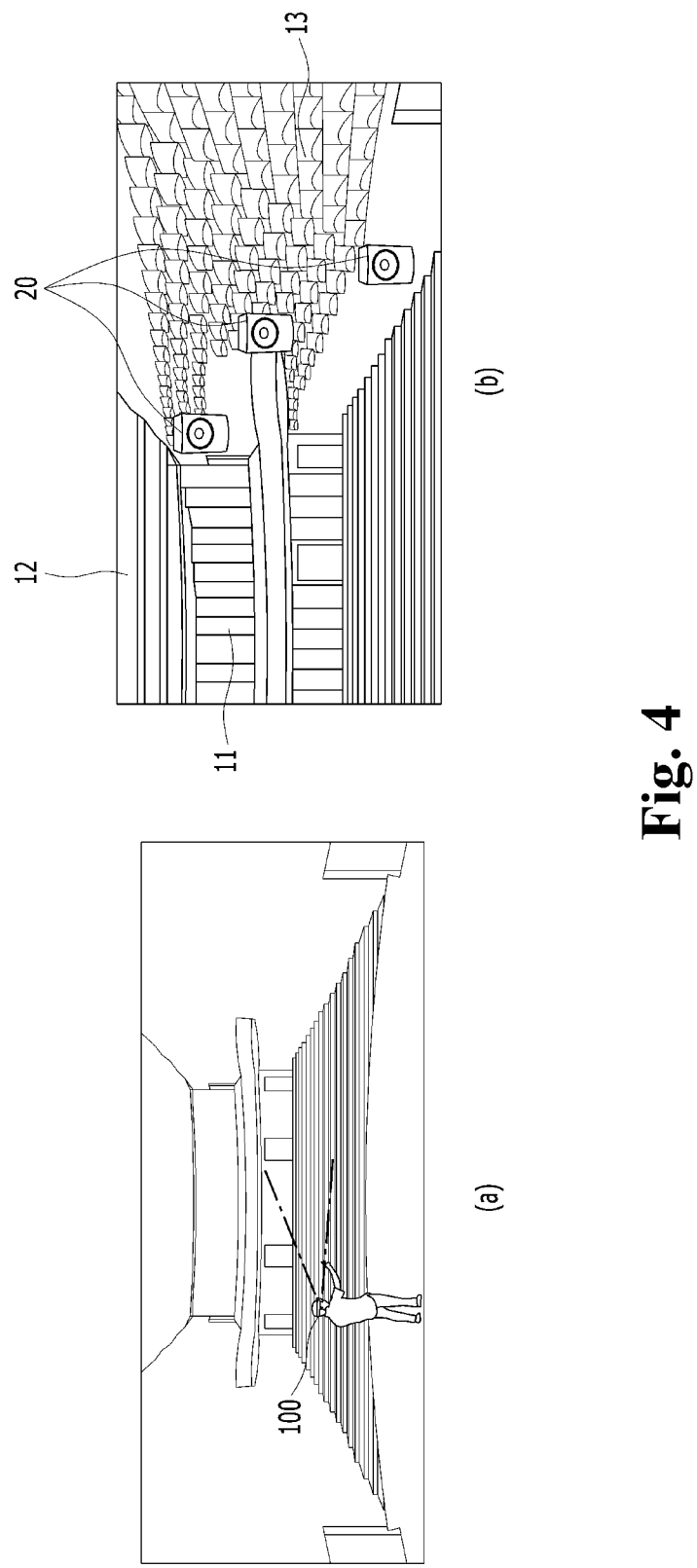
FIG. 4 is a diagram for describing another example of an image displayed in the acoustic simulation apparatus of the present disclosure.
Figure 5:
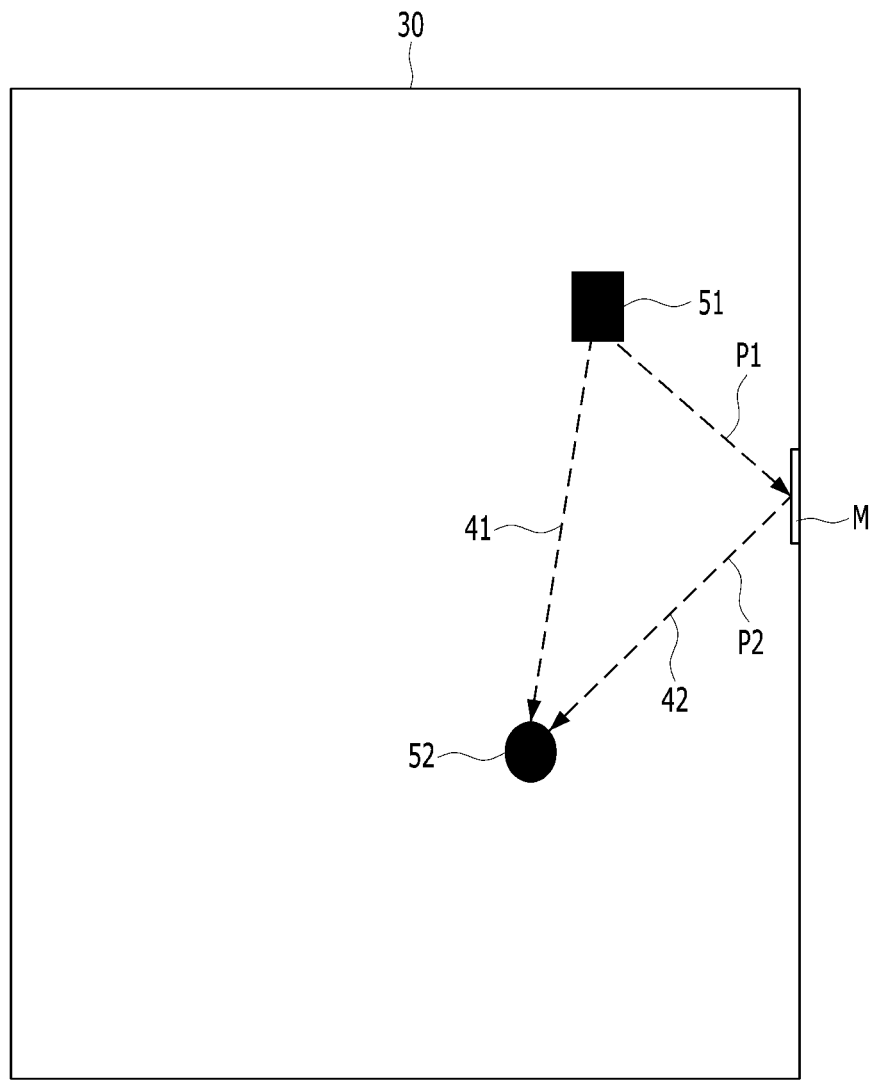
FIG. 5 is a diagram for describing an example of a method of simulating sound by the acoustic simulation apparatus of the present disclosure.

FIG. 2 is a flowchart for describing an example of a method of simulating sound by the acoustic simulation apparatus according to several exemplary embodiments of the present disclosure. FIG. 3 is a diagram for describing an example of an image displayed in the acoustic simulation apparatus of the present disclosure. FIG. 4 is a diagram for describing another example of an image displayed in the acoustic simulation apparatus of the present disclosure. FIG. 5 is a diagram for describing an example of a method of simulating sound by the acoustic simulation apparatus of the present disclosure.

Referring to FIG. 2, the processor 110 of the acoustic simulation apparatus 100 may acquire building structure information related to a building forming a simulation space (S110).

In particular, the processor 110 may receive the building structure information from an external server or an external terminal through the communication unit 120. Herein, the external server or the external terminal may be related to a company or a user related to the design of the building. However, the present disclosure is not limited thereto.

The processor 110 of the acoustic simulation apparatus 100 may receive an input of the building structure information from the user through the input unit 160. That is, the user may input the building structure information related to the building, on which the acoustic simulation is to be performed, to the acoustic simulation apparatus 100.

The building structure information according to the exemplary embodiments of the present disclosure may include at least one of information about a plan blueprint of the building (for example, information about whether the building is rectangular, fan-shaped, polygonal, or horseshoeshaped), information about the shape of the ceiling of the building (for example, information about whether the ceiling of the building is curved), information about a shape of a balcony disposed inside the building (for example, information about whether the balcony disposed inside the building is long or fan-shaped), information about a shape of an inner wall of the building (for example, information on a wall surface plan, such as whether there is a shape for sound absorption treatment on the inner wall of the building), information on a structure of a floor of the building (for example, information about whether the building is stepped or flat, and what the floor of the stage looks like), or information about a location and a shape of a reflective plate existing inside the building. However, the present disclosure is not limited thereto.

According to several exemplary embodiments of the present disclosure, the processor 110 of the acoustic simulation apparatus 100 may acquire building material information related to at least one building material used in a simulation space (S120).

The building material information according to several exemplary embodiments of the present disclosure may include at least one of first appearance information on an appearance of at least one building material (for example, information on a material of the appearance of the building material and information on a color of the appearance of the building material), first sound information on reflectance of sound of at least one building material, and second sound information on sound absorption coefficient of at least one building material.

For example, the building material information may include information on the material used in the building itself, information on the material used in the ceiling of the building, information on the material of the balcony disposed inside the building, information on the material of the inner wall of the building, information on the material of the floor of the building, and information on the material of the reflective plate installable in the building. Herein, the information on the material of each of the building itself, the ceiling, the balcony, the floor, and the reflective plate may mean information about the appearance of each material and information related to the reflection or the absorption of the sound (sound waves) due to the material constituting each material. However, the present disclosure is not limited thereto.

In the meantime, the processor 110 may receive a first input for selecting any one of the plurality of building materials usable in the simulation space when acquiring the building material information. Further, the processor 110 may acquire the building material information related to at least one building material used in the simulation space among the information about the plurality of building materials stored in the memory 130 based on the first input.

In particular, the processor 110 may control the image output unit 140 so as to output (display to the user) an image in which the information on each of the plurality of building materials applicable (that is, installable) to the simulation space is listed. Further, the processor 110 may receive the first input for selecting at least one building material included in the listed image from the user through the input unit 160.

That is, the processor 110 may receive the first input for selecting at least one building material which is to be applicable to the simulation space among the plurality of building materials from the user through the input unit 160. Further, the processor 110 may search for the pre-stored building material information corresponding to the first input in the memory 130 and acquire the building material information corresponding to the first input. Herein, the memory 130 may store the information about each of the plurality of building materials in advance.

The processor 110 may receive the building material information corresponding to the first signal from the external server or the external terminal through the communication unit 120. In particular, the processor 110 may transmit a first signal requesting the building material information corresponding to the first input to the external server or the external terminal. Further, the processor 110 may receive the building material information corresponding to the first input from the external server or the external terminal. Herein, the external server or the external terminal may store the information about each of the plurality of building materials in advance. Further, the external server or the external terminal may transmit building material information corresponding to a signal to the acoustic simulation apparatus 100 according to the reception of the signal requesting building material information about a specific building material from the acoustic simulation apparatus 100.

Accordingly, the user may omit a separate calculation for checking the information (for example, reflectance and/or sound absorption coefficient of the building material) related to the building material to be applied to the simulation space. That is, the acoustic simulation apparatus 100 may solve inconvenience for the user by checking the information related to the building material.

The processor 110 may control the image output unit 140 so as to output first recommendation information that recommends any one of the plurality of building materials before the first input is received. Herein, the first recommendation information may be generated by comparing expected sound generated by installing each of the plurality of building materials in the simulation space. For example, when a predetermined speaker is installed at a predetermined location in the plurality of simulation spaces in which the plurality of building materials is installed, the processor 110 may generate the first recommendation information by comparing the sound acquired at a predetermined listening point. However, the present disclosure is not limited thereto.

Accordingly, the user may easily select the building material suitable for application to the simulation space among various building materials.

According to several exemplary embodiments of the present disclosure, the processor 110 of the acoustic simulation apparatus 100 may acquire speaker information related to at least one speaker installed in the simulation space (S130).

The speaker information according to several exemplary embodiments of the present disclosure may include at least one among installation location information about at least one speaker (for example, information on a point at which at least one speaker is installed and information on a direction in which at least one speaker is installed), second appearance information about an appearance of at least one speaker, and third sound information about a sound characteristic of at least one speaker.

In the meantime, the processor 110 may receive a second input for selecting any one of the plurality of speakers installable in the simulation space when acquiring speaker information. Further, the processor 110 may acquire speaker information related to at least one speaker used in the simulation space among the information related to the plurality of speakers stored in the memory 130 based on the second input.

In particular, the processor 110 may control the image output unit 140 so as to output (display to the user) an image in which the information on each of the plurality of speakers installable in the simulation space is listed. Further, the processor 110 may receive a second input for selecting at least one speaker included in the listed image from the user through the input unit 160.

That is, the processor 110 may receive the second input for selecting at least one speaker to be installed in the simulation space among the plurality of speakers from the user through the input unit 160. Further, the processor 110 may acquire speaker information corresponding to the second input pre-stored in the memory 130. Herein, the memory 130 may pre-store the information about each of the plurality of speakers.

The processor 110 may receive the speaker information corresponding to the second input from the external server or the external terminal through the communication unit 120. In particular, the processor 110 may transmit a second signal requesting the speaker information corresponding to the second input to the external server or the external terminal. Further, the processor 110 may receive the speaker information corresponding to the second signal from the external server or the external terminal. Herein, the external server or the external terminal may store the information about each of the plurality of speakers in advance. Further, the external server or the external terminal may transmit speaker information corresponding to a signal to the acoustic simulation apparatus 100 according to the reception of the signal requesting speaker information about a specific speaker from the acoustic simulation apparatus 100.

Accordingly, the processor 110 of the acoustic simulation apparatus 100 may solve inconvenience that the user needs to separately search for the information about the speaker to be applied to the simulation space (for example, the output amount for each frequency band of the speaker).

The processor 110 may control the image output unit 140 so as to output second recommendation information for recommending any one of the plurality of speakers before receiving the second input. Herein, the second recommendation information may be generated by comparing the expected sound generated by installing each of the plurality of speakers at the predetermined location of the simulation space by using the speaker information about each of the plurality of speakers stored in the memory 130. For example, when each of the plurality of speakers is installed in the simulation space, the processor 110 may generate the second recommendation information by comparing the sound acquired at a predetermined listing point. However, the present disclosure is not limited thereto.

Accordingly, the user may easily select the speakers suitable to be installed in the simulation space among various speakers.

In the meantime, the processor 110 may control the image output unit 140 so as to output third recommendation information for recommending an installation location of at least one of the speakers after receiving the second input. Herein, the third recommendation information may be generated by comparing the expected sound generated by installing the speakers selected through the second input at each of the plurality of locations. For example, when at least one speaker is installed at each of the plurality of locations in the simulation space, the processor 110 may generate the third recommendation information by comparing the sound acquired at a predetermined listening point. However, the present disclosure is not limited thereto.

Accordingly, the user may conveniently recognize the suitable location suitable for installing the speaker among various locations in which the speaker is installable.

According to several exemplary embodiments of the present disclosure, the processor 110 of the acoustic simulation apparatus 100 may acquire location information about the current location of the sound simulation apparatus through the location recognizing unit 170 (S140). Further, the processor 110 may recognize a virtual location corresponding to the current location in the simulation space by analyzing the acquired location information (S150).

In particular, the processor 110 may recognize a ratio of a size of the space by comparing a size of a real space and a size of the simulation space. Further, the processor 110 may recognize a virtual location corresponding to the current location in the simulation space by using the ratio for the size and the location information.

More particularly, the processor 110 may recognize a size of the real space (for example, a floor width of the real space and a height of a ceiling of the real space). Further, the processor 110 may recognize the size of the simulation space (that is, a floor width of the simulation space and a height of a ceiling of the simulation space). Further, the processor 110 may recognize a ratio of the size of the real space and the size of the virtual space. Further, the processor 110 may acquire a real movement distance moved in the real space (that is, acquire location information about the current location at a predetermined time interval). Further, the processor 110 may recognize a virtual location corresponding to the current location in the simulation space by calculating the ratio and the real movement distance. However, the present disclosure is not limited thereto.

Accordingly, the user may more naturally (similar to the real space) recognize the inside of the simulation space by moving the virtual space (that is, the simulation space) based on the virtual location recognized by the processor 110.

According to the several exemplary embodiments of the present disclosure, when the processor 110 of the acoustic simulation apparatus 100 recognizes the virtual location, the processor 110 may generate an image viewed from the virtual location based on the building structure information, the building material information, and the speaker information (S160).

In particular, the processor 110 may generate the image viewed from the virtual location by using the location information, the building structured information, the first appearance information, and the second appearance information. More particularly, the processor 110 may generate the image visible in the field of vision at which the user equipped with the acoustic simulation apparatus 100 looks at the simulation space at the virtual location based on the VR or the AR.

The processor 110 may control the image output unit 140 so as to output the generated image.

For example, the image generated by the processor 110 may be the virtual image for at least one building material viewed in the field of vision at which the user equipped with the acoustic simulation apparatus 100 looks at the simulation space at the virtual location and the inner shape of the building in which at least one speaker is installed. That is, the processor 110 may generate a simulation image based on VR.

In particular, referring to (a) of FIG. 3, the user equipped with the acoustic simulation apparatus 100 may see the inner space of the building for performing the acoustic simulation through the acoustic simulation apparatus 100 in the space that is not the building for performing the acoustic simulation. For example, the user illustrated in (a) of FIG. 3 may be the user wearing the acoustic simulation apparatus 100 implemented in the form of the HMD illustrated in (b) of FIG. 1B. However, the present disclosure is not limited thereto.

That is, the user may perform the acoustic design inside the specific building by using the acoustic simulation apparatus 100 without a spatial limitation.

Referring to (b) of FIG. 3, a virtual image displayable (in particular, a VR image) to the user is illustrated. As illustrated in (b) of FIG. 3, the virtual image may include a first wall surface to which a first material 11 used in the simulation space is applied, a ceiling to which a second material 12 is applied, and a second wall surface to which a third material 13 is applied. Further, the virtual image may include at least one speaker 20 installed in the simulation space. However, the image output in the acoustic simulation apparatus 100 is not limited thereto.

Accordingly, the user may check the interior of the simulation space, as well as to perform the acoustic design of the simulation space, by using the acoustic simulation apparatus 100.

For another example, the image generated by the processor 110 may be the image overlapping to the general field of vision of the user when the user wearing the acoustic simulation apparatus 100 views the simulation space at the virtual location. That is, the processor 110 may generate the simulation image based on the AR. In this case, the image output unit 140 may be formed of a light-transmitting material to project the image to the eyes of the user.

In particular, referring to (a) of FIG. 4, the user equipped with the acoustic simulation apparatus 100 may view the overlapping image through the acoustic simulation apparatus 100 in the inner space of the building for performing the acoustic simulation. For example, the user illustrated in (a) of FIG. 4 may be the user wearing the acoustic simulation apparatus 100 implemented in the form of the AR glasses illustrated in (a) of FIG. 1B. However, the present disclosure is not limited thereto.

Referring to (b) of FIG. 4, the matter viewed to the user (in particular, the AR image) is illustrated. As illustrated in (b) of FIG. 4, the overlapping image may include the first wall surface to which the first material 11 used in the simulation space is applied, and the ceiling to which the second material 12 is applied, and the second wall surface to which the third material 13 is applied. Further, the virtual image may include at least one speaker 20 installed in the simulation space. However, the image output in the acoustic simulation apparatus 100 is not limited thereto.

That is, as illustrated in (a) of FIG. 4, the user wearing the acoustic simulation apparatus 100 may look inside the building to which the building material is not applied. However, the images of the building material and at least one speaker overlap to the general field of vision of the user, so that the user may check the interior of the building where the building material selected by the user is applied and at least one speaker is installed as illustrated in (b) of FIG. 4.

Accordingly, the building material and/or the speaker does not exist in the real space, but the user wearing the acoustic simulation apparatus 100 may recognize as if the building material and/or the speaker exist in the real space.

That is, the acoustic simulation apparatus 100 may display the space illustrated in (b) of FIG. 4 to the user located in the space illustrated in (a) of FIG. 4 in which the specific material is not applied or the specific speaker is not installed through the overlap image.

Accordingly, the user may check the interior of the simulation space, as well as to perform the acoustic design of the simulation space, by using the acoustic simulation apparatus 100.

The acoustic simulation apparatus 100 according to several exemplary embodiments of the present disclosure may provide the user with the image for the simulation space with the virtual image (FIG. 3), or provide the user with the image for the simulation space with the image overlapping the general field of vision (FIG. 4) as described with reference to FIGS. 3 and 4.

According to additional several exemplary embodiments of the present disclosure, when the processor 110 of the acoustic simulation apparatus 100 generates an image viewed from a virtual location, the processor 110 may recognize a sub sound characteristic of each of one or more sub spaces forming the simulation space. Further, the processor 110 may generate the image so that the image effect corresponding to the sub sound characteristic is displayed.

Accordingly, the user may intuitively recognize the sound characteristic for each sub space of the simulation space.

Hereinafter, the method of generating an image in which an image effect is displayed by the processor 110 will be described below with reference to FIGS. 6 and 7.

Referring back to FIG. 2, when the processor 110 of the acoustic simulation apparatus 100 recognizes the virtual location, the processor 110 may generate sound heard at the virtual location based on the building structure information, the building material information, and the speaker information (S170).

First, the processor 110 may acquire first sound characteristic information about a characteristic of first virtual sound which is output from at least one speaker and is directly delivered to the user located at the virtual location.

In particular, the processor 110 may generate the first sound characteristic information based on the installation location information about at least one speaker, the location information about the acoustic simulation apparatus 100, and the third sound information about at least one speaker.

More particularly, referring to FIG. 5, the processor 110 may recognize a first location 51 at which at least one speaker is installed in the simulation space 30 by using the installation location information. Further, the processor 110 may recognize a second location 52 that is the current location of the acoustic simulation apparatus in the simulation space 30 by using the location information. Further, the processor 110 may recognize whether an object (that is, an obstacle) exists between the first location 51 and the second location 52 by using the building structure information. Further, the processor 110 may recognize first virtual sound 41 directly delivered from the first location 51 to the second location 52. Further, the processor 110 may generate the first sound characteristic information by using the first virtual sound 41. However, the present disclosure is not limited thereto.

In the meantime, the processor 110 may generate second sound characteristic information about a characteristic of second virtual sound 42 which is output from at least one speaker and is indirectly delivered to the user located at the virtual location. Herein, the second virtual sound 42 may be the virtual sound changed by absorbing or reflecting the first virtual sound 41 by at least one building material.

In particular, the processor 110 may generate the second sound characteristic information based on the installation location information about at least one speaker, the location information about the acoustic simulation apparatus 100, the building structure information, the first appearance information (for example, the information about the material of the appearance of the building material) about the appearance of the building material, the first sound information about reflectance of the sound of at least one building material, the second sound information about sound absorption coefficient of at least one building material, and the third sound information about the sound characteristic of at least one speaker.

More particularly, the processor 110 may recognize the first location 51 at which at least one speaker is installed in the simulation space 30 by using the installation location information. Further, the processor 110 may recognize the second location 52 that is the current location of the acoustic simulation apparatus in the simulation space 30 by using the location information. Further, the processor 110 may recognize a first progress path P1 of the virtual sound output from at least one speaker by using the third sound information.

When the processor 110 recognizes the first progress path P1 of the virtual sound, the processor 110 may recognize a second progress path P2 in which the virtual sound collides and is changed by using the building structure information. Further, the processor 110 may recognize first information about a reflectance of the sound of a specific building material M and second information about sound absorption coefficient of the specific building material existing between the first progress path P1 and the second progress path P2 among at least one building material by using the first sound information and the second sound information. Further, the processor 110 may recognize the second virtual sound 42 which is output from at least one speaker and is indirectly delivered to the user located at the virtual location via the first progress path P1, the specific building material M, and the second progress path P2.

That is, the processor 110 may recognize the second virtual sound 42 by using the installation location information about at least one speaker, the location information about the acoustic simulation apparatus 100, the building structure information, the first appearance information, the first information, the second information, and the third sound information. Further, the processor 110 may generate the second sound characteristic information by using the second virtual sound 42. However, the present disclosure is not limited thereto.

When the processor 110 of the acoustic simulation apparatus 100 acquires the first sound characteristic information and generates the second sound characteristic information, the processor 110 may generate sound heard at the virtual location based on the first sound characteristic information and the second sound characteristic information. In particular, the processor 110 may generate the sound by using sound characteristic information of the direct sound (that is, the sound directly delivered to the user) included in the first sound characteristic information and sound characteristic information of the indirect sound (that is, the sound indirectly delivered to the user) included in the second sound characteristic information. However, the present disclosure is not limited thereto.

The processor 110 may control the sound output unit 150 so as to output the generated sound.

Accordingly, even though the user does not directly install a finishing material (herein, the building material) or a speaker inside the building, the user may check the interior of the building and perform acoustic design inside the building.

Figure 6:
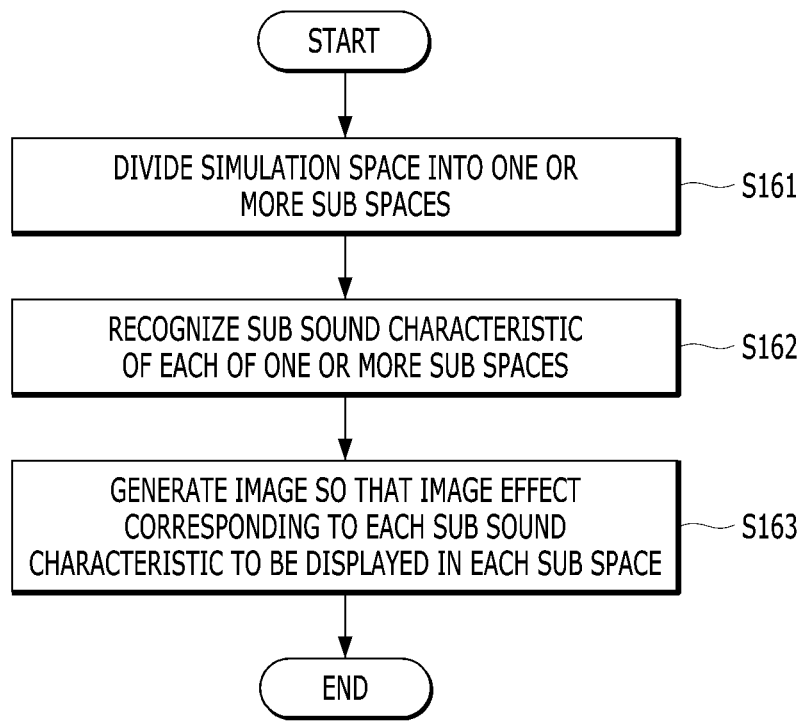
FIG. 6 is a flowchart for describing an example of a method of generating an image displaying an image effect corresponding to a sound characteristic by the acoustic simulation apparatus according to several exemplary embodiments of the present disclosure.

FIG. 6 is a flowchart for describing an example of a method of generating an image displaying an image effect corresponding to a sound characteristic by the acoustic simulation apparatus according to several exemplary embodiments of the present disclosure. FIG. 7 is a diagram for describing an example of a simulation image according to several exemplary embodiments of the present disclosure.

First, referring to FIG. 6, the processor 110 of the acoustic simulation apparatus 100 may divide a simulation space into one or more sub spaces (161).

In particular, the processor 110 may recognize a plurality of sub spaces having different sound characteristics in the simulation space. Further, the processor 110 may divide the simulation space into the plurality of recognized sub spaces.

Figure 7:
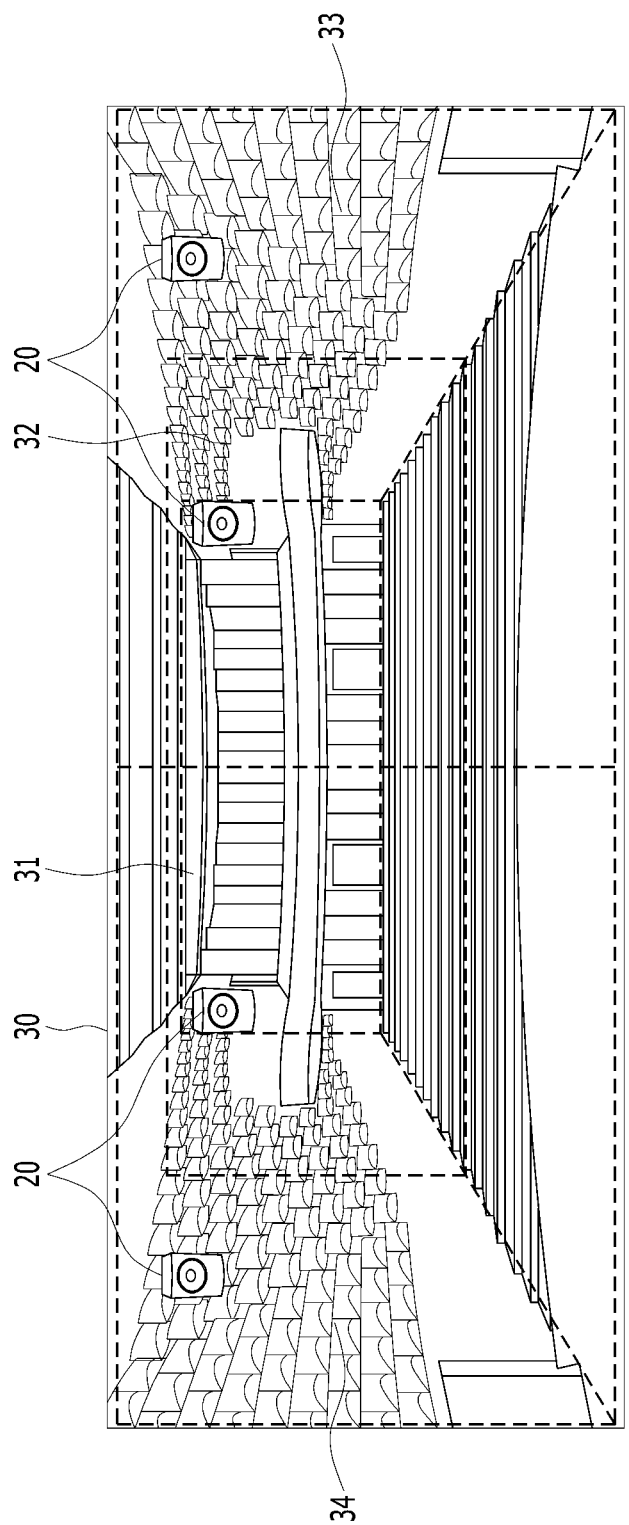
FIG. 7 is a diagram for describing an example of a simulation image according to several exemplary embodiments of the present disclosure.

Referring to FIG. 7, as illustrated, the simulation space 30 in which at least one speaker 20 is installed may be divided into four sub spaces.

That is, the processor 110 may divide the simulation space 30 into a first sub space 31, a second sub space 32, a third sub space 33, and a fourth sub space 34. Herein, each of the first sub space 31, the second sub space 32, the third sub space 33, and the fourth sub space 34 may have a different sound characteristic. However, the present disclosure is not limited thereto, and each the first sub space 31, the second sub space 32, the third sub space 33, and the fourth sub space 34 may have the same different sound characteristic.

Referring back to FIG. 6, the processor 110 of the acoustic simulation apparatus 100 may recognize a sub sound characteristic of each of one or more sub spaces (S162).

In particular, the processor 110 may recognize the sub sound characteristic of each sub space by using a specific location included in each sub space as a virtual location.

More particularly, the processor 110 may generate sub sound heard at the virtual location by using the specific location included in each sub space as the virtual location. Further, the processor 110 may recognize a sound characteristic of the generated sub sound. Herein, the sound characteristic may include at least one of, for example, information on the amplification amount for each predetermined frequency band of the sound, information on the attenuation amount for each predetermined frequency band, and information on reverberation time for each predetermined frequency band (for example, the time when the direct sound is attenuated by 60 dB after the direct sound is output and then becomes extinct). However, the present disclosure is not limited thereto, and the sound characteristic information may also further include information on sound clarity and information on a frequency response characteristic (for example, information on a balance between bass sound and alto sound).

In the meantime, the processor 110 may generate an image so that the image effect corresponding to each sub sound characteristic is displayed in each sub space (S163).

The image effect according to several exemplary embodiments of the present disclosure may include a color effect and a fog effect.

For example, the fog effect of a first color (for example, red) may be displayed in the first sub space having the first sound characteristic. Further, the fog effect of a second color (for example, green) may be displayed in the second sub space having the second sound characteristic. However, the present disclosure is not limited thereto.

For another example, the bottom surface and/or the wall surface of the first sub space having the first sound characteristic may be filled with the first color (for example, red). Further, the bottom surface and/or the wall surface of the second sub space having the second sound characteristic may be filled with the second color (for example, green). However, the present disclosure is not limited thereto.

Accordingly, the user of the acoustic simulation apparatus 100 of the present disclosure may intuitively recognize the sound characteristic for each sub space of the simulation space through the color corresponding to the sound characteristic.

Figure 8:
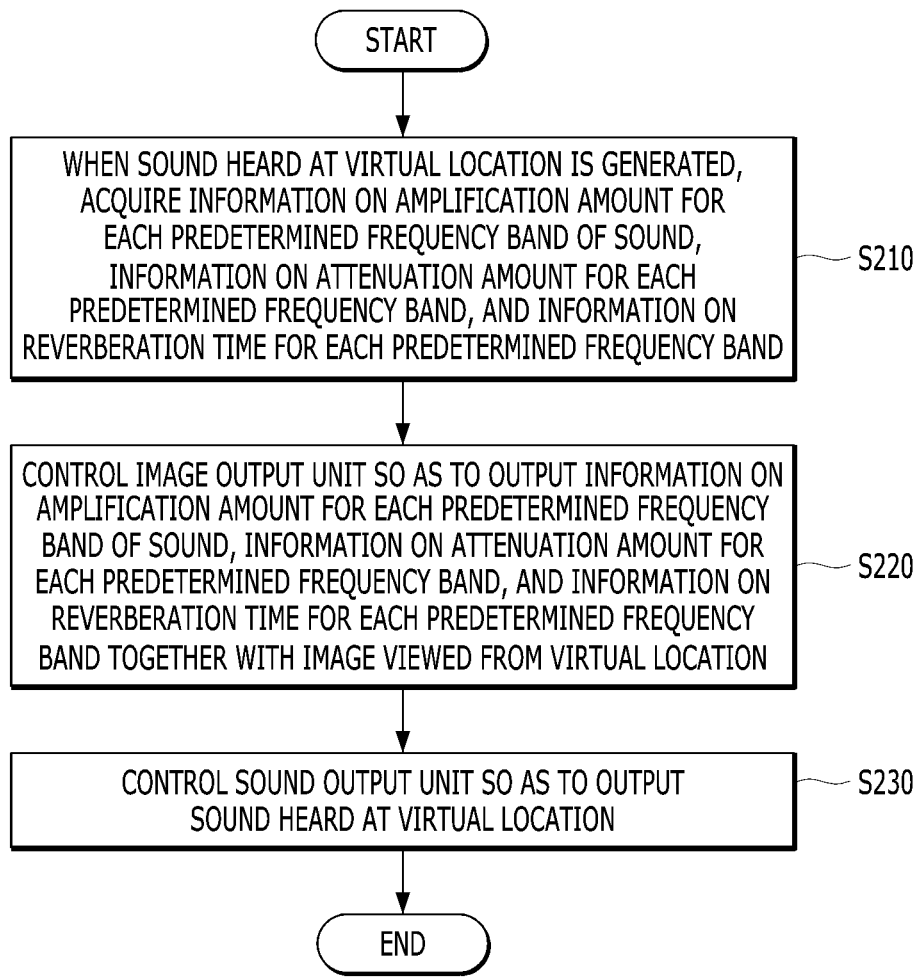
FIG. 8 is a flowchart for describing an example of a method of providing acoustic related information by the acoustic simulation apparatus according to several exemplary embodiments of the present disclosure.

FIG. 8 is a flowchart for describing an example of a method of providing acoustic related information by the acoustic simulation apparatus according to several exemplary embodiments of the present disclosure.

According to several exemplary embodiments of the present disclosure, when the processor 110 of the acoustic simulation apparatus 100 generates the sound heard at the virtual location in operation S170 of FIG. 2, the processor 110 may analyze the sound and generate sound characteristic information.

In particular, the processor 110 may simulate that an audible frequency (20 hz to 20 Khz) is emitted from at least one speaker installed in the simulation space. Further, the processor 110 may generate sound characteristic information by analyzing a pattern of the reflective sound at the audible frequency simulated to be emitted for each predetermined frequency band.

Herein, the sound characteristic generated by analyzing the sound may include information on the amplification amount for each predetermined frequency band of the sound, information on the attenuation amount for each predetermined frequency band, and information on reverberation time for each predetermined frequency band (for example, the time when the direct sound is attenuated by 60 dB after the direct sound is output and then becomes extinct). However, the present disclosure is not limited thereto, and the sound characteristic information may also further include information on sound clarity and information on a frequency response characteristic (for example, information on a balance between bass sound and alto sound).

Referring to FIG. 8, as described above, when the processor 110 of the acoustic simulation apparatus 100 generates the sound heard at the virtual location, the processor 110 may acquire the information on the amplification amount for each predetermined frequency band of the sound, the information on the attenuation amount for each predetermined frequency band, and the information on reverberation time for each predetermined frequency band (S210).

The processor 110 may control the image output unit 140 so as to output the information on the amplification amount for each predetermined frequency band of the sound, the information on the attenuation amount for each predetermined frequency band, and the information on reverberation time for each predetermined frequency band together with the image viewed from the virtual location (S220).

Accordingly, the user may conveniently perform the acoustic design through the acoustic simulation apparatus 100. In particular, the user may easily select or tune the speaker and select the finishing material to be suitable to the simulation space by using the sound characteristic information provided from the acoustic simulation apparatus 100.

The processor 110 may control the sound output unit 150 so as to output the sound heard at the virtual location (S230).

That is, the user may check the information about the sound characteristic in the form of the audible information, as well as the visual information, through the acoustic simulation apparatus 100. Accordingly, the user may more accurately and conveniently perform the acoustic design by recognizing the sound characteristic through the senses of sight and hearing.

Figure 9:
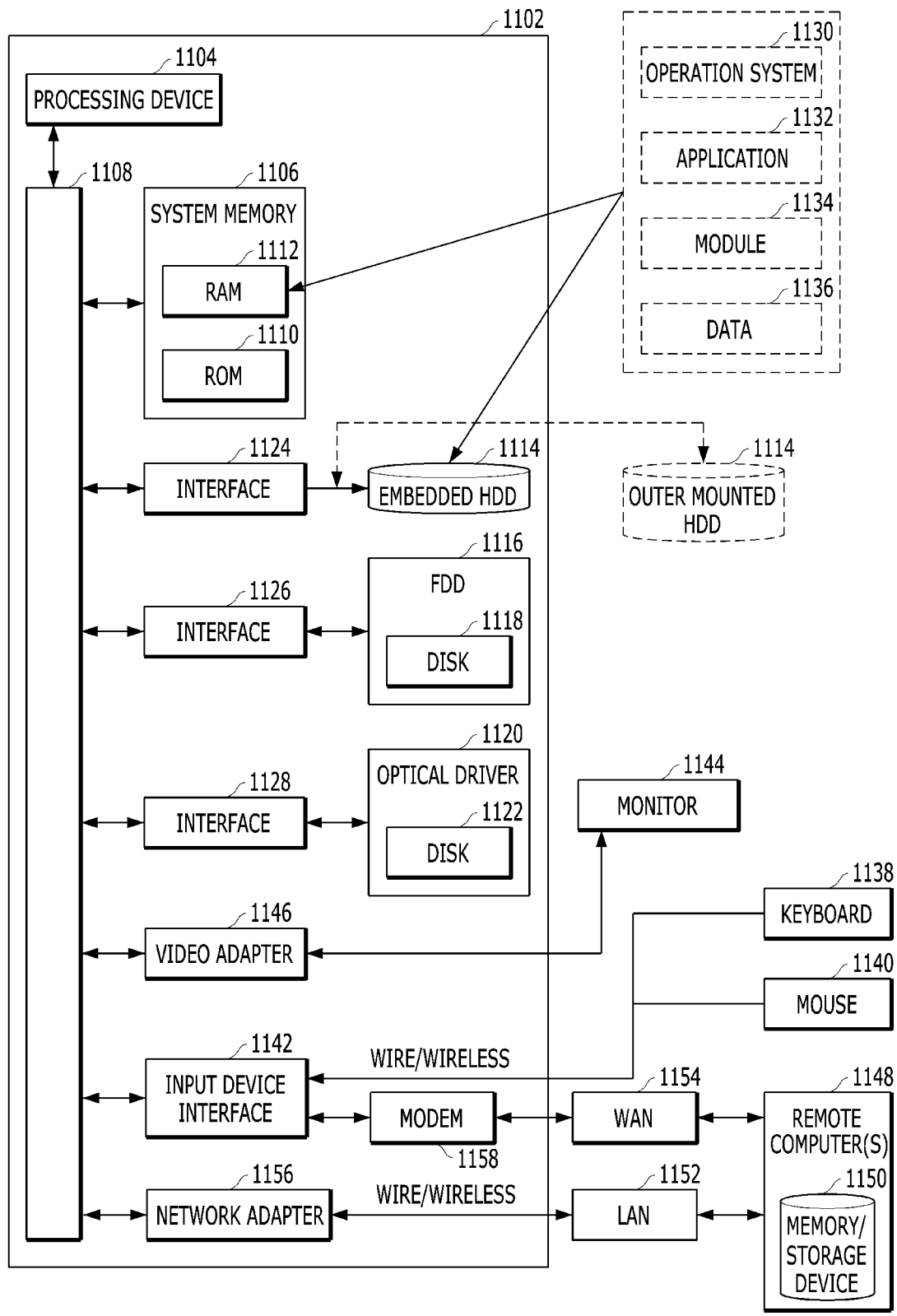
FIG. 9 is a simple and general schematic diagram illustrating an example of a computing environment in which the exemplary embodiments of the contents of the present disclosure are implementable.

FIG. 9 is a simple and general schematic diagram illustrating an example of a computing environment in which the exemplary embodiments of the contents of the present disclosure are implementable.

The present disclosure has been generally described in relation to a computer executable command executable in one or more computers, but those skilled in the art will appreciate well that the present disclosure is combined with other program modules and/or be implemented by a combination of hardware and software.

In general, a module in the present specification includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A non-transitory computer readable medium containing a computer program, wherein the computer program includes commands which cause a processor of an acoustic simulation apparatus to execute steps, the steps comprising:
    acquiring building structure information related to a building constituting a simulation space;
    acquiring building material information related to at least one building material used in the simulation space;
    obtaining speaker information related to at least one speaker installed in the simulation space, wherein the speaker information includes installation location information of the at least one speaker, second appearance information on an appearance of the at least one speaker, and third sound information on sound characteristics of the at least one speaker;
    obtaining location information on a current location of the acoustic simulation apparatus;
    recognizing a virtual location corresponding to the current location in the simulation space by analyzing the location information;
    generating an image viewed from the virtual location based on the building structure information, the building material information, and the speaker information including the installation location information of the at least one speaker and the second appearance information about the external shape of the at least one speaker; and
    generating sound to be heard at the virtual location based on the building structure information, the building material information, and the speaker information including the installation location information of the at least one speaker and the third sound information on the sound characteristics of the at least one speaker.

2. The non-transitory computer readable medium of claim 1, wherein the acquiring building material information related to at least one building material used in the simulation space comprises:
    receiving a first input for selecting any one of a plurality of building materials usable in the simulation space; and
    acquiring the building material information related to the at least one building material used in the simulation space from among information related to the plurality of building materials stored in a memory based on the first input.

3. The non-transitory computer readable medium of claim 2, wherein the acquiring building material information related to at least one building material used in the simulation space further comprises:
    controlling an image output unit to output first recommendation information for recommending any one of the plurality of building materials before receiving the first input, and
    wherein the first recommendation information is generated by comparing sound expected to be generated by installing each of the plurality of building materials in the simulation space.

4. The non-transitory computer readable medium of claim 1, wherein the obtaining speaker information related to at least one speaker installed in the simulation space comprises:

receiving a second input for selecting any one of a plurality of speakers that are able to be installed in the simulation space; and acquiring the speaker information related to the at least one speaker used in the simulation space from among information related to the plurality of speakers stored in a memory based on the second input.

5. The non-transitory computer readable medium of claim 1, wherein the obtaining speaker information related to at least one speaker installed in the simulation space further comprises:

controlling an image output unit to output second recommendation information recommending any one of the plurality of speakers before receiving the second input; and controlling the image output unit to output third recommendation information recommending an installation location of the at least one speaker after receiving the second input, and wherein the third recommendation information is generated by comparing sound expected to be generated by installing a speaker selected through the second input at each of a plurality of locations.

6. The non-transitory computer readable medium of claim 1, wherein the building structure information comprises at least one of information on a plan design of the building, information on a ceiling shape of the building, information on a shape of a balcony disposed inside the building, information on a shape of inner wall of the building, or information on location and shape of reflector inside the building, and wherein the building material information comprises at least one of first appearance information on an appearance of the at least one building material, first sound information on reflectance of sound of the at least one building material, or second sound information on sound absorption coefficient of the at least one building material.

7. The non-transitory computer readable medium of claim 6, wherein the generating an image viewed from the virtual location based on the building structure information, the building material information and the speaker information comprises:

generating the image using the location information, the building structure information, the first appearance information, and the second appearance information.

8. The non-transitory computer readable medium of claim 6, further comprising:

outputting the image through an image output unit; and wherein the image is a virtual image of an interior shape of the building in which the at least one building material and the at least one speaker are installed, which are visible from a view of the simulation space by a user equipped with the acoustic simulation apparatus at the virtual location.

9. The non-transitory computer readable medium of claim 6, further comprising:

controlling an image output unit made of a light-transmitting material to project the image to user's eyes;

wherein, when user equipped with the acoustic simulation apparatus looks at the simulation space from the virtual location, the image overlaps on a general field of the user's vision.

10. The non-transitory computer readable medium of claim 1, wherein the generating an image viewed from the virtual location based on the building structure information, the building material information, and the speaker information comprises:

dividing the simulation space into one or more sub-spaces;

recognizing sub-sound characteristics of each of the one or more sub-spaces; and generating the image so that a video effect corresponding to each of the sub-sound characteristics is displayed in each of the sub-spaces.

11. The non-transitory computer readable medium of claim 1, wherein the generating sound to be heard at the virtual location based on the building structure information, the building material information, and the speaker information comprises:

generating first sound characteristic information on characteristics of a first virtual sound emitted from the at least one speaker and directly transmitted to a user located at the virtual location and generating second sound characteristic information on a characteristic of a second virtual sound emitted from the at least one speaker and indirectly transmitted to the user located at the virtual location; and generating the sound based on the first sound characteristic information and the second sound characteristic information.

12. The non-transitory computer readable medium of claim 11, wherein the generating first sound characteristic information and second sound characteristic information comprises:

generating the first sound characteristic information based on the installation location information, the location information, and the third sound information; and generating the second sound characteristic information based on the installation location information, the location information, the building structure information, the first appearance information, the first sound information, the second sound information, and the third sound information.

13. The non-transitory computer readable medium of claim 12, wherein the second virtual sound is a virtual sound changed by absorbing or reflecting the first virtual sound by the at least one building material.

14. The non-transitory computer readable medium of claim 12, wherein the generating the first sound characteristic information based on the installation location information, the location information, and the third sound information comprises:

recognizing a first location in which the at least one speaker is installed using the installation location information;

recognizing a second location, which is a current location of the acoustic simulation apparatus, using the location information;

recognizing whether an object exists between the first location and the second location using the building structure information; and generating the first sound characteristic information by recognizing a sound wave emitted from the first position to the second position using the third sound information.

15. The non-transitory computer readable medium of claim 12, wherein the generating the second sound characteristic information based on the installation location information, the location information, the building structure information, the first appearance information, the first sound information, the second sound information, and the third sound information comprises:

recognizing a first location in which the at least one speaker is installed using the installation location information;

recognizing a second location, which is a current location of the acoustic simulation apparatus, using the location information;

recognizing a first travel path of a virtual sound emitted from the at least one speaker using the third sound information;

recognizing a second travel path changed by collision of the virtual sound using the building structure information when the first travel path of a virtual sound is recognized;

recognizing first information on reflectance of a sounds of a specific building material existing between the first and second paths among the at least one building material and second information on sound absorption coefficient of the specific building material using the first sound information and the second sound information;

generating the second sound characteristic information using the installation location information, the location information, the building structure information, the first appearance information, the first information, the second information, and the third sound information.

16. The non-transitory computer readable medium of claim 1, further comprising:

obtaining information on an amplification amount for each preset frequency band of the sound, information on an attenuation amount for the preset frequency band, and information on a reverberation time for the preset frequency band when the sound to be heard at the virtual location is generated;

controlling an image output unit to output the information an amplification amount for each preset frequency band, the information on an attenuation amount for the frequency band, and the information on a reverberation time for the preset frequency band together with the image; and controlling a sound output unit to output the sound.

17. An acoustic simulation apparatus comprising:

a processor for acquiring building structure information related to a building constituting a simulation space;

an image output unit for outputting an image related to the simulation space; and a sound output unit for outputting sound;

wherein the processor is further configured to:

obtain speaker information related to at least one speaker installed in the simulation space and location information on a current location of the acoustic simulation apparatus, wherein the speaker information includes installation location information of the at least one speaker, second appearance information on an appearance of the at least one speaker, and third sound information on sound characteristics of the at least one speaker;

recognize a virtual location corresponding to the current location in the simulation space by analyzing the location information;

generate an image viewed from the virtual location based on the building structure information, building material information, and the speaker information including the installation location information of the at least one speaker and the second appearance information about the external shape of the at least one speaker; and generate sound to be heard at the virtual location based on the building structure information, the building material information, and the speaker information including the installation location information of the at least one speaker and the third sound information on the sound characteristics of the at least one speaker.

\* \* \* \* \*